Feb. 11, 1936.     E. J. BACIGALUPI     2,030,424
SAND TRAP RAKE
Filed Nov. 27, 1934     2 Sheets-Sheet 2

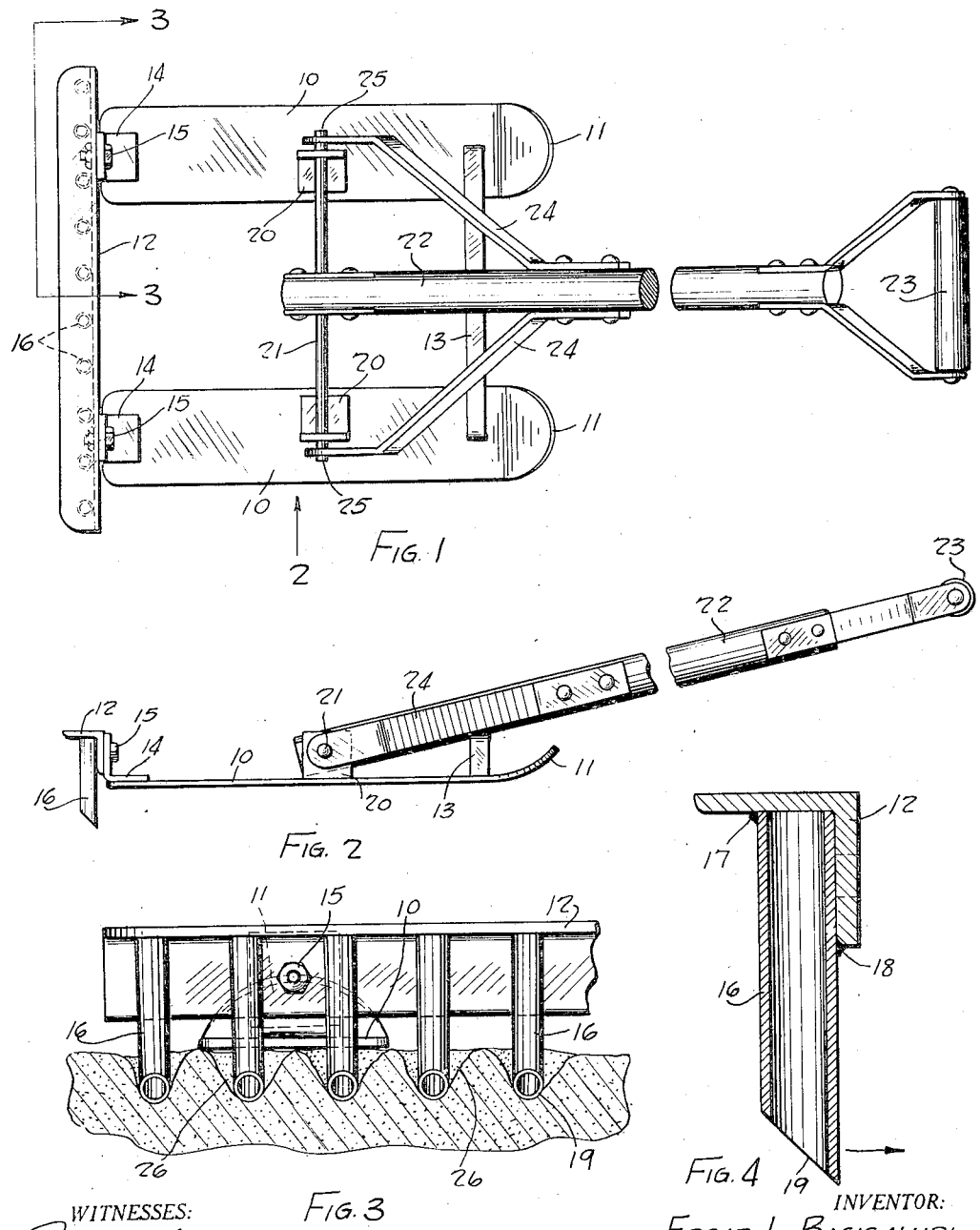

WITNESSES:

INVENTOR:
EDGAR J. BACIGALUPI
BY
ATTORNEY

Patented Feb. 11, 1936

2,030,424

UNITED STATES PATENT OFFICE 2,030,424

SAND TRAP RAKE

Edgar J. Bacigalupi, Red Bank, N. J.

Application November 27, 1934, Serial No. 754,935

5 Claims. (Cl. 55—10)

This invention relates to sand trap rakes, and has for an object to provide a raking device for producing a sand trap surface of general planarity, but uniformly grooved.

A further object of the invention is to provide a device having shoes proportioned and adapted to slide along the surface of the sand trap, with depending teeth of such proportion and spacing as to leave in the rear of the rake when it has passed a grooved or fluted surface lying generally in a plane.

A further object of the invention is to provide a sand trap rake having one or more shoes properly proportioned and curved to be drawn manually or otherwise along upon the surface of the sand of a sand trap, with teeth depending below the lower plane or surface of the shoes properly proportioned to operate upon the sand to produce a generally level or symmetrical effect.

A further object of the invention is to provide a sand trap rake comprising a pair of shoes having one or both ends bent upwardly to serve as runners for supporting the rake when pushed, pulled or both, and with a handle so mounted relative to the shoes that the structure may be lifted by the handle to remain approximately in the plane of the handle.

A further object of the invention is to provide in a sand trap rake teeth of improved type embodying tubes cut upon a taper, adapted to be moved with the longer side of the tube in advance.

The drawings illustrate several embodiments of the invention and the views therein are as follows:

Figure 1 is a top plan view of one embodiment of the invention,

Figure 2 is a view in side elevation, as indicated by arrow 2 at Figure 1,

Figure 5:
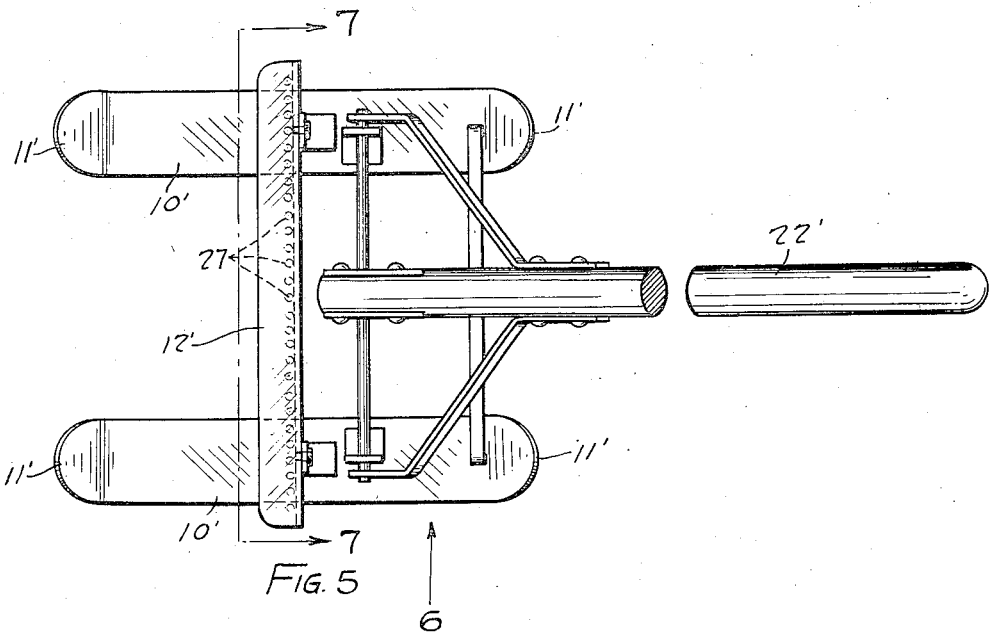
Figure 6:
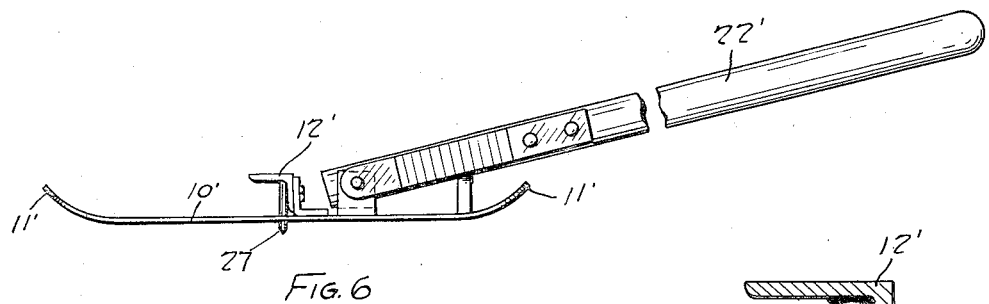
Figure 7:
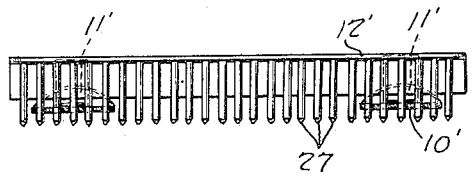
Figure 8:
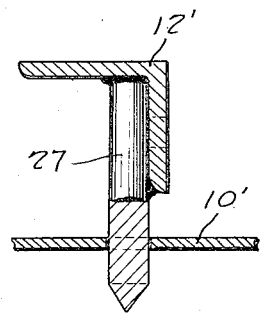

Figure 3 is a detailed view on an enlarged scale, as indicated by line 3—3 of Figure 1, Figure 4 is an enlarged detail substantially diametrical view of one of the teeth, Figure 5 is a top plan of a different embodiment of the rake, Figure 6 is a view of the rake shown at Figure 5, seen in side elevation, as indicated by arrow 6 at Figure 5, Figure 7 is a sectional view taken on line 7—7 of Figure 1, and Figure 8 is an enlarged detail view of one of the end teeth of the type shown at Figure 5.

Like characters of reference indicate corresponding parts throughout the several views.

The sand trap rake disclosed in the present application comprises a pair of shoes 10, preferably each turned or bowed upwardly, as at 11, and connected by means of a bar 12 at the rear end and a brace 13 adjacent the forward end.

The bar 12 is preferably an angle bar, as shown more particularly at Figures 2 and 4, and is attached to the shoes by means of brackets 14. These brackets 14 may be attached to the shoes in any approved manner. As disclosed, welding is indicated, but it is to be understood that the invention is in no way limited thereby. The bar 12 is secured to these brackets also in any approved manner. As indicated in the drawings, bolts 15 are shown, but are to be considered merely a mechanical expedient.

The angle bar 12 is preferably mounted with the angle at the rear and a plurality of teeth 16 are secured to this bar. Again, the manner of securing the teeth may be any approved expedient but indicated as being welded at 17 and 18.

The teeth are preferably constructed of tubing for the purpose of securing the desired diameter without adding unduly to the weight. The tube is cut upon an angle, as shown at 19, and is intended to travel in the direction indicated by the arrow at Figure 4.

For the purpose of manipulating the rake, other brackets 20 are secured upon the shoes 10. This securing may be in any manner preferred, but the disclosure would indicate welding, but without limitation. A rod or bar 21 is journaled upon the brackets 20 and carries a handle 22. Preferably, this handle will be provided with a D-head 23, but this is a matter of choice and also without limitation. The handle is provided with braces 24 which engage at 25 the opposite ends of the bar 21. The relation of the pivoting by the bar 21 to the brace bar 13 is such that with the handle positioned as shown at Figure 2, the shoes and rake structure may be lifted by lifting the handle with the rake proper approximately in the plane of the handle, as therein shown. This is for the purpose of transporting the rake from one position to another.

In some sand traps on some courses it is considered desirable to add to the difficulty of the sand trap by forming the surface with grooves, of such depth and width as to partially contain a golf ball. As shown at Figure 3 the movement of the rake will, by reason of the shoes 10, maintain the device at a uniform position relative to the surface of the sand and the teeth 16 will, therefore, dig into the sand a substantially uniform distance to provide grooves or corrugations 26 so that a ball landing in the trap will land also in one of the grooves and thereby make the play more difficult.

Under some conditions, however, it is desirable to smooth the surface as distinguished from forming grooves therein. For that purpose, the rake as shown at Figure 5 is employed, wherein the shoes 10' are substantially the same as the shoes 10, except being turned up at both ends at 11', as shown.

The bar 12' is likewise preferably an angle bar, and the teeth 27 also secured thereto in the same manner as outlined in regard to the teeth 16. The handle 22' may be also provided with a D-head, as shown in regard to Figure 1, but preferably will not be so constructed so that with the particular type shown at Figures 5 and 6, the device as an entirety may be alternately pushed and pulled, whereby a D-head is not considered as convenient.

In all other respects the type shown at Figures 5 and 6 is the equivalent of that shown at Figures 1 and 2. The teeth, as it will be noted, are set much closer together and are much smaller in diameter, whereas the surface is given a roughened appearance rather than a grooved or corrugated surface.

Of course, the sand trap rake herein illustrated may be modified and changed in various ways without departing from the invention herein set forth and hereinafter claimed.

I claim:—

1. A sand trap rake comprising spaced shoes, a bar extending transversely relative to and connecting the shoes, teeth carried by the bar extending downwardly beyond the lower surface of the shoes, and an operating handle pivotally attached to the shoes.

2. A sand trap rake comprising a pair of spaced shoes having corresponding ends curved upwardly, a bar extending transversely of and rigidly connecting the shoes, teeth carried by the bar extending below the lower surface of the shoes, an operating handle pivoted to the shoes, and a brace bar interconnecting the shoes and serving to limit the angular relative movement of the handle.

3. A sand trap rake comprising a pair of shoes having corresponding ends curved upwardly, an angle bar extending transversely of and interconnecting the shoes, teeth mounted in the angle of the bar and extending therefrom below the lower surface of the shoes, a rod extending transversely across between the shoes, and a handle pivoted upon the rod.

4. A sand trap rake comprising a pair of spaced shoes, an angular bar extending transversely of and rigidly interconnecting the shoes, the flanges of said angle bar extending horizontally and vertically with the face of the angle opening rearwardly and downwardly, teeth secured in the angle of the bar and along the vertical flange and extending below the lower surface of the shoes, and an operating handle mounted upon the shoes.

5. A sand trap rake comprising a pair of spaced shoes having corresponding ends curved upwardly, an angle bar extending transversely of the shoes and remote from the curved ends, the axis of the angle of said bar extending rearwardly and downwardly, teeth secured to the upper flange of the bar and along the surface of the vertical bar and to a position below the lower surface of the shoes, an operating handle pivotally mounted upon the shoes, and a brace bar extending across and rigidly interconnecting the shoes, said brace bar being positioned to limit the angular movement of the handle relative to the shoes to maintain the handle and shoes approximately in the same plane.

EDGAR J. BACIGALUPI.